United States Patent [19]
Limb et al.

[11] 3,715,483
[45] Feb. 6, 1973

[54] BANDWIDTH REDUCTION SYSTEM FOR USE WITH VIDEO SIGNALS

[75] Inventors: John Ormond Limb, New Shrewsbury; Roger Fabian Wedgwood Pease, Holmdel, both of N.J.

[73] Assignee: Bell Telephone Laboratories, Incorporated, Murray Hill, N.J.

[22] Filed: Dec. 11, 1970

[21] Appl. No.: 97,079

[52] U.S. Cl. ..............................178/6.8, 178/DIG. 3
[51] Int. Cl. ..............................H04n 7/12
[58] Field of Search ....178/6.8, DIG. 3, 6, 7.2, 7.5 R; 179/2 TV

[56] References Cited

UNITED STATES PATENTS

| | | | |
|---|---|---|---|
| 2,921,124 | 1/1960 | Graham | 178/DIG. 3 |
| 3,366,739 | 1/1968 | Parkinson | 179/15.55 R |
| 3,499,980 | 3/1970 | Smierciak | 178/DIG. 3 |
| 2,906,816 | 9/1959 | Kretzmer | 178/DIG. 3 |
| 3,582,543 | 6/1971 | Davies et al. | 178/DIG. 24 |
| 3,573,789 | 4/1971 | Sharp et al. | 178/DIG. 3 |

*Primary Examiner*—Howard W. Britton
*Attorney*—R. J. Guenther and E. W. Adams, Jr.

[57] ABSTRACT

Changes in the amplitude values of the picture elements in every fourth field of an interlaced video signal are counted in order to determine whether or not movement has occurred in the picture. If movement has not occurred, alternate frames are transmitted to the receiving location. If movement has occurred, alternate fields are transmitted to the receiving location. In the receiver, when no movement is detected, the amplitude value for each picture element in the frames which have not been transmitted is reconstituted by temporally interpolating between the corresponding amplitude values for that picture element in the adjacent transmitted video frames. When movement is detected, the amplitude values for each picture element in the nontransmitted fields is established by temporally and spatially interpolating between the values for the picture elements taken from adjacent lines in the fields which precede and follow the nontransmitted picture element. To buffer the selected video information with a transmission system having a constant bit rate, the even picture elements are stored for transmission during the intervals when the frames and fields are blocked from being coupled through to the transmission channel.

12 Claims, 12 Drawing Figures

PATENTED FEB 6 1973

3,715,483

SHEET 1 OF 8

INVENTORS J. O. LIMB
R. F. W. PEASE

BY Daniel D. Dubosky

ATTORNEY

STATIONARY MODE

MOVING MODE

FIG. 12

| FIELD NO. | f | F | S | GATE OUTPUT | BUFFERED DATA | POINT Q | $S_F$ | $(\bar{S}_F\bar{F}+S_F f)$ | POINT U | POINT R | POINT T | $(\bar{S}_F\bar{F}+S_F\bar{f})$ | OUTPUT |
|---|---|---|---|---|---|---|---|---|---|---|---|---|---|
| | TRANSMITTING TERMINAL | | | | | RECEIVING TERMINAL | | | | | | | |
| 1 | 0 | 0 | 0 | 1 | 1o | | | | | | | | |
| 2 | 1 | 0 | 0 | 2 | 2o | | | | | | | | |
| 3 | 0 | 1 | 0 | | 1e | 1 | 0 | 0 | 1 | | | | |
| 4 | 1 | 1 | 0 | | 2e | 2 | 0 | 0 | 2 | $\bar{1}$ | | | |
| 5 | 0 | 0 | 0 | 5 | 5o | | 0 | 1 | 1 | $\bar{2}$ | 1 | 1 | 1 |
| 6 | 1 | 0 | 1 | | 5e | | 0 | 1 | 2 | $\bar{1}$ | 2 | 1 | 2 |
| 7 | 0 | 1 | 1 | 7 | 7o | 5 | 0 | 0 | 5 | $\bar{2}$ | 1 | 0 | $(1+5)/2$ |
| 8 | 1 | 1 | 1 | | 7e | | 1 | 1 | $\bar{5}$ | $\bar{5}$ | 2 | 0 | $(2+\bar{5})/2$ |
| 9 | 0 | 0 | 1 | 9 | 9o | 7 | 1 | 0 | 7 | $\bar{\bar{5}}$ | 5 | 1 | 5 |
| 10 | 1 | 0 | 0 | 10 | 10o | | 1 | 1 | $\bar{7}$ | $\bar{7}$ | $\bar{5}$ | 0 | $(\bar{5}+\bar{7})/2$ |
| 11 | 0 | 1 | 0 | | 9e | 9 | 1 | 0 | 9 | $\bar{\bar{7}}$ | 7 | 1 | 7 |
| 12 | 1 | 1 | 0 | | 10e | 10 | 0 | 0 | 10 | $\bar{9}$ | $\bar{7}$ | 0 | $(\bar{7}+10)/2$ |
| 13 | 0 | 0 | 0 | 13 | 13o | | 0 | 1 | 9 | $\overline{10}$ | 9 | 1 | 9 |
| 14 | 1 | 0 | 0 | 14 | 14o | | 0 | 1 | 10 | $\bar{9}$ | 10 | 1 | 10 |

BANDWIDTH REDUCTION SYSTEM FOR USE WITH VIDEO SIGNALS

BACKGROUND OF THE INVENTION

This invention relates to bandwidth reduction systems for use with video signals and, more particularly, to bandwidth reduction systems which transmit and reject entire fields of video information.

In order to transmit video signals which are generated in connection with a video-telephone service over large distances, it will be necessary to reduce the required long haul transmission bandwidth to an absolute minimum; otherwise, the service will be limited for economic reasons to rather short distances. One method which has been initially introduced to accomplish this objective of reducing the bandwidth is the use of an encoder which transmits only the changes which take place between adjacent samples in a video signal. This type of encoder is known in the art as a differential pulse code modulation encoder. It has been described in numerous periodicals. See, for example, "A Digital Differential Quantizer for Television," by J. O. Limb and F. W. Mounts in the *Bell System Technical Journal, Volume* 48, pages 2,583 through 2,599, 1969.

Still another type of bandwidth reduction system for use with video signals known to the prior art is described in U.S. Pat. No. 3,366,739 of Jan. 30, 1968 to R. W. Parkinson. In this bandwidth reduction system only one out of several video frames is transmitted to the receiving location. The in-between nontransmitted frames are reconstructed at the receiver by linearly interpolating between the appropriate values obtained from the transmitted frames. In applying this technique to video signals of the type which are generated in a video-telephone service, alternate frames were transmitted to a receiving location and the nontransmitted frames were reconstructed by averaging the values for the corresponding picture elements in each of the transmitted frames. Subjective tests showed that this type of bandwidth reduction resulted in better motion rendition than that which is obtainable from simple frame repeating, but the motion rendition was still unsatisfactory for moderate and fast movement of subjects having normal contrast. The degradation became particularly annoying at speeds of about two picture elements per frame interval. At these speeds, the motion resulted in a jerky and blurred image. This is believed to occur because the interpolation is occurring over the large interval of one video frame.

If the motion degradation problems inherent in the last-mentioned redundancy reduction system could be reduced, this type of system would be especially useful since it could be combined with the first-mentioned element-to-element video encoder to provide an additional reduction in the bandwidth requirements. This operation in tandem is permitted since the last-mentioned redundancy reduction system processes video signals without changing the element-to-element relationships in any of the video lines which are selected for transmission. Hence, the element-to-element values established by the differential PCM encoder could be transmitted to a receiving location and reconstructed without any deterioration in any of the lines which have been selected for transmission.

SUMMARY OF THE INVENTION

A primary object of the present invention is to reduce the amount of information which must be transmitted for a video signal without introducing excessive subjectively annoying effects resulting from interpolation during picture movement over intervals as long as a video frame.

Another object of the present invention is to provide this bandwidth reduction without modifying the element-to-element values which have been obtained from an element-to-element coder while processing an entire video line of information.

These objects and others are achieved in accordance with the present invention wherein the number of frame-to-frame amplitude changes occurring in the same picture elements is utilized to determine whether or not movement has occurred in the picture. Only two fields out of four are coupled by the transmitter to the receiving location. If the movement detector indicates that no movement has taken place, alternate frames are transmitted to the receiving location. If movement has occurred, alternate fields are transmitted to the receiving location. In the receiver, the nontransmitted frames are reconstructed by temporally interpolating between amplitude values which have been transmitted for each of the picture elements. In response to an indication that movement has occurred, the value for each picture element is determined by spatially and temporally interpolating between the values for adjacent picture elements in the preceding and following fields in lines both above and below the picture element whose value is being reconstructed. A novel form of buffering is utilized by storing the values of alternate picture elements for transmission during the intervals when fields and/or frames are being blocked.

BRIEF DESCRIPTION OF THE DRAWINGS

The invention will be more readily understood when the following detailed description is read in conjunction with the drawings wherein:

FIG. 12 is a table of logical values and field numbers useful in describing the operation of the present invention.

DETAILED DESCRIPTION

In addition to being useful with video signals which have been previously encoded to reduce transmission bit rate or bandwidth, the present bandwidth reduction system can also be utilized with previously unencoded video signals to provide a two-to-one reduction in bit rate or bandwidth. Accordingly, the present invention will be first described in connection with the embodiment of FIGS. 1 and 2 which has as its input a standard analog video signal of the type which is generated by horizontally scanning a video image in an interlace format with intervals called frames and subintervals called fields. An additional embodiment will be described in connection with FIGS. 3 and 4, wherein the input video signal has already been processed by an encoder such as, for example, the differential PCM coder heretofore described in connection with processing videotelephone signals.

Figure 1:
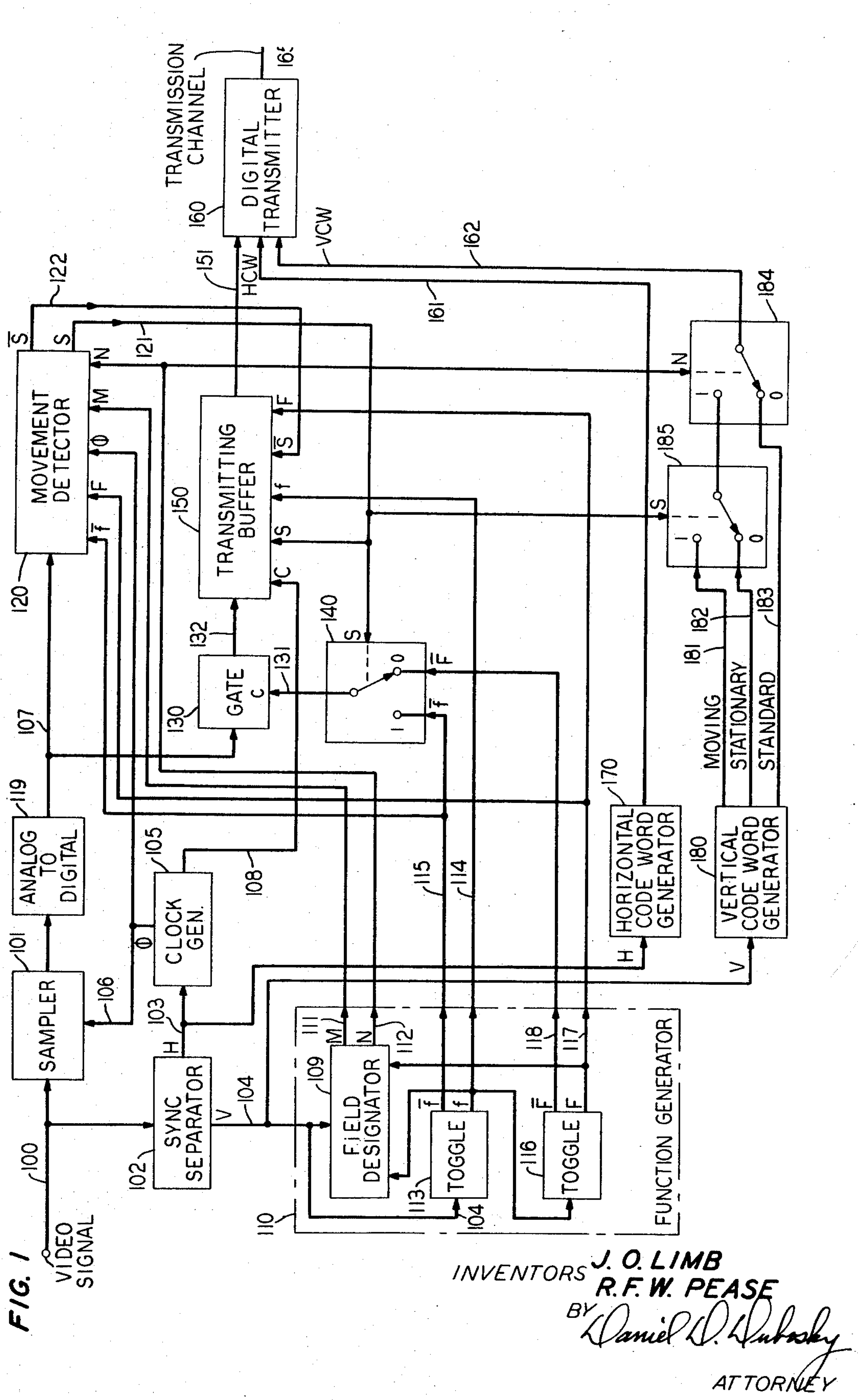
FIG. 1 is a schematic block diagram of a transmitter constructed in accordance with the present invention.

In FIG. 1, an analog video signal is coupled by way of line 100 to the input of a sampler 101 and to the input of a sync separator 102. In response to the horizontal and vertical synchronization pulses present within the analog signal on line 100, sync separator 102 provides a voltage impulse on line 103 during the horizontal blanking interval and, in addition, provides a voltage impulse on line 104 during the vertical blanking interval. In response to each voltage impulse on line 103, clock generator 105 provides voltage impulses on line 106 (designated as $\phi$ in FIG. 1) during the active region of each horizontal video scanning line. The voltage impulses on line 106 are, of course, provided at the rate at which samples must be taken of the input video signal in order to transmit the desired information contained in that signal. This rate is commonly referred to as the Nyquist rate.

In response to each voltage impulse provided by clock generator 105 on line 106, sampler 101 provides at its output an analog voltage sample of the video signal. The output of sampler 101 in turn is connected to the input of an analog-to-digital converter 119 which produces a digital word on bus 107 whose value is an indication of the amplitude of the video signal at that instant. Bus 107, like all other lines in the drawing and referred to hereinafter as buses, is actually constructed of a plurality of transmission paths, one path for each digital bit said to be present within the digital word on the particular bus. This form of transmission is known in the art as parallel bit transmission but it is to be understood that the invention may be equally utilized with samples that are represented in serial bit form.

Figure 11:
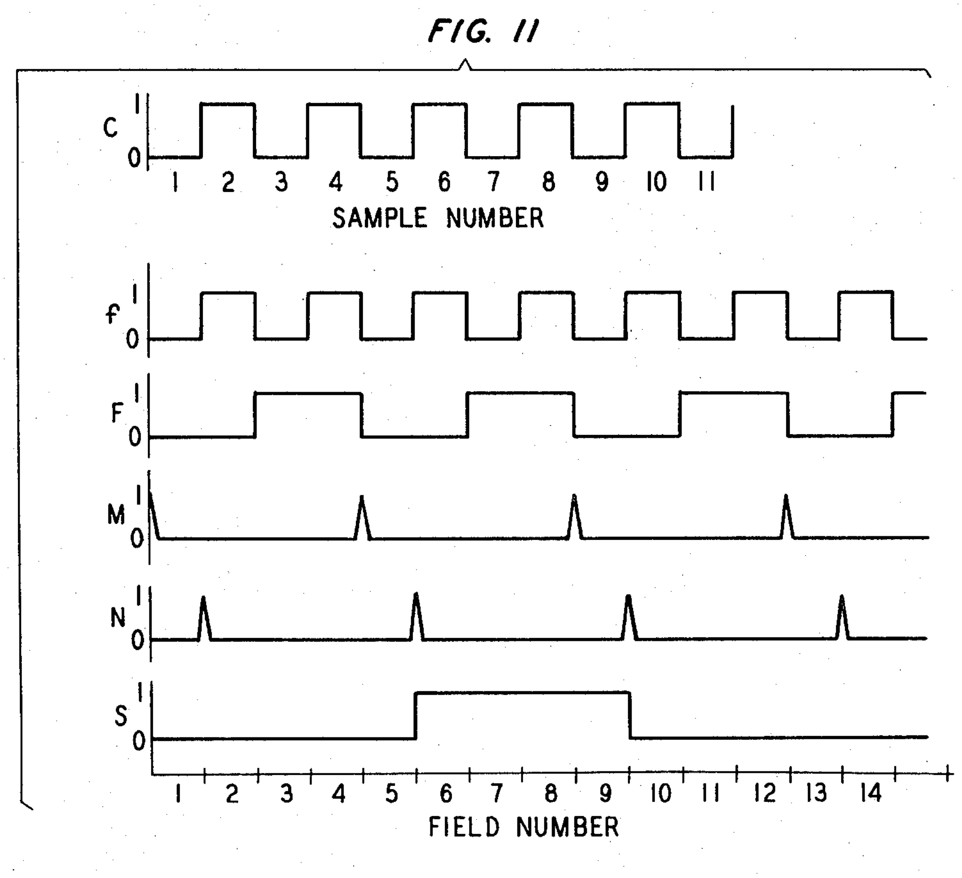
FIG. 11 is a family of waveforms useful in describing the operation of the present invention.

Clock generator 105 also provides, on line 108, a logical bit waveform of the type shown as waveform C of FIG. 11. A logical "0" is provided in waveform C on line 108 during each odd picture element that is sampled by sampler 101 during the active region of each horizontal video line. For each even picture element during this same interval, a logical "1" is provided by clock generator 105 on line 108.

Each voltage impulse present on line 104 during the vertical blanking interval is coupled to the input of a toggle circuit 113 and to the input of a field designator 109. The voltage impulses on line 104 cause toggle circuit 113 to toggle between alternate logical "0s" and "1s" at the vertical blanking rate on each of its output lines designated as lines 114 and 115 in FIG. 1. The pattern of logical "0s" and "1s" presented on line 114 is designated in the drawings as waveform $f$. Its complement is provided on line 115 and is designated as $\bar{f}$ in the drawings. Since the vertical blanking intervals occur between each of the fields in each video frame, circuit 113 toggles so as to provide alternate logical "0s" and "1s" on lines 114 and 115 during each succeeding field.

The stream of logical "0s" and "1s" on line 114 is coupled to the input of a second toggle circuit 116. Each negative-going voltage transition on line 114 causes toggle circuit 116 to change the state of its output. As a result, toggle circuit 116 produces a stream of logical "0s" and "1s" at its output line 117 having a waveform shown as waveform F of FIG. 11. It can be seen in waveform F of FIG. 11 that the logical state provided by toggle circuit 116 on line 117 remains unchanged for an interval equal in duration to two fields, or one video frame. Toggle circuit 116 also provides a complement of the F waveform at its output line 118. This complementary waveform is designated in the drawings as $\bar{F}$.

The $f$ voltage waveform on line 114 and the F voltage waveform on line 117 are coupled to the field designator 109. In response to the voltage impulse on line 104 which occurs after both waveforms $f$ and F have been in the logical "1" state, field designator 109 provides a voltage impulse on line 111 designated as the M waveform in FIG. 11. In response to the voltage impulse on line 104 which occurs after both waveforms $f$ and F have been in the logical "0" state, field designator 109 provides a voltage impulse on line 112 designated as the N waveform in FIG. 11. As illustrated in FIG. 11, the action by field designator 109 results in producing voltage impulses on lines 111 and 112 at a four-field rate, i.e., once every four field intervals. For the arbitrarily designated field numbers in FIG. 11, a voltage impulse occurs on line 111 during the vertical blanking intervals preceding field numbers 1, 5, 9, 13 et cetera, and a voltage impulse occurs on line 112 during the vertical blanking intervals following field numbers 1, 5, 9, 13 et cetera.

The waveforms designated as C, $f$, F, M and N of FIG. 11 are continuously generated by clock generator 105, field designator 109, and toggle circuits 113 and 116. In order to discuss the operation of the present invention, the video fields existing in the video signal on line 100 during each of the logical states present in waveforms $f$, F, M and N of FIG. 11 have been arbitrarily assigned in FIG. 11 to fields numbered 1 through 14.

Figure 5:
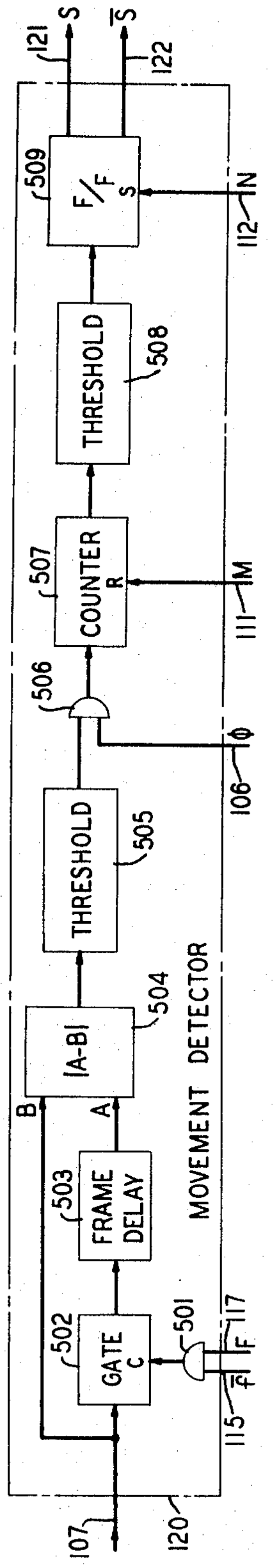
FIGS. 5, 6 and 7 are schematic block diagrams of apparatus which are shown as blocks in FIGS. 1 through 4.

The digital words developed on bus 107 by sampler 101 are, of course, simply a PCM rendition of the analog video signal on line 100. These digital words are coupled both to the input of a movement detector 120 and to the input of a transmission gate 130. Movement detector 120, in a manner to be described hereinafter in connection with FIG. 5, responds to the waveforms $\bar{f}$, F, $\phi$, M and N and produces a logical state at its output on line 121 during each four-field interval to indicate whether or not movement has occurred in the picture. If movement has occurred, a logical "1" is produced on line 121; otherwise, a logical "0" is produced. This detection of movement by detector 120 is accomplished by comparing the picture element values in the field interval between the pulses M and N with the corresponding picture element values from the field interval one frame time earlier. In terms of the arbitrarily designated field numbers in FIG. 11, the picture element values in field 5 are compared with the element values in field 3. If this comparison results in a number of indicated changes which exceeds a threshold value, movement detector 120 produces a logical "1" at its output on line 121 for the next four field intervals. If the number of changes in picture element values does not exceed the predetermined threshold value, movement detector 120 indicates that movement has not occurred by producing a logical "0" on line 121 during the next four field intervals. In a similar fashion, the picture element values during field 9 are compared with the element values from field 7 to provide an indication during fields 10 through 13 as to whether or not movement has occurred in the picture. The complementary function of the logical "0s" and "1s" on line 121 is provided by movement detector 120 on line 122.

Transmission gate 130 is actually constructed of a plurality of AND gates, one input of each AND gate being connected to a transmission path in bus 107 and the other input of each AND gate being connected to a path designated in FIG. 1 as line 131. Each digital word present on bus 107 may therefore be coupled through gate 130 only when line 131 is provided with a voltage equivalent to the logical "1" state. In this way, the signal on line 131 provides the control function of transmission gate 130.

Line 131 is provided with either of the functions $\bar{f}$ or $\bar{F}$, depending on the state of switch 140. Switch 140, like all other similarly illustrated single-pole-double-throw switches, is actually constructed of a plurality of AND gates and OR gates. Switch 140 directs either the logical state presented by $\bar{f}$ or the logical state presented by $\bar{F}$ through to line 131, depending on the logical state present on line 121 from movement detector 120. During the intervals when a logical "0" is present on line 121, that is, during those intervals when movement has not been indicated, the logical state provided by $\bar{F}$ is connected through switch 140 by way of bus 131 to the control input of gate 130. During the field intervals when a logical "1" is present on line 121, that is, during the intervals when movement has been indicated, the logical state presented by $\bar{f}$ is connected through switch 140 to the control input of gate 130.

From waveform F in FIG. 11, it can easily be seen that the coupling of $\bar{F}$ through to the control input of transmission gate 130 will result in the coupling of alternate frames of digital words from bus 107 through gate 130 to the input of a transmission buffer 150. In terms of the field numbers provided in FIG. 11, fields 1 and 2, 5 and 6, 9 and 10 et cetera will be coupled through to buffer 150. From waveform $f$ in FIG. 11 it can easily be seen that alternate fields of digital words will be coupled through gate 130 to the input of transmission buffer 150 when $\bar{f}$ is coupled through to the control input of gate 130. In terms of the field numbers designated in FIG. 11, the odd-numbered fields will be coupled through to buffer 150. Hence, during periods of no movement, alternate frames of digital words are coupled through to transmission buffer 150 whereas during intervals indicated as having movement alternate fields are coupled through to transmission buffer 150.

Transmission buffer 150, in a manner to be described hereinafter in connection with FIG. 6, stores some of the digital words provided at its input so as to provide a continuous stream of digital words to the input of a digital transmitter 160. Digital transmitter 160 is also provided with code words during each of the horizontal and vertical blanking intervals on lines 161 and 162, respectively. These digital code words are transmitted to the receiving location in order to maintain synchronization between the two locations. Each voltage impulse on line 103 during the horizontal blanking intervals causes a horizontal code word generator 170 to produce a horizontal code word on line 161. Similarly, each voltage impulse on line 104 during the vertical blanking interval causes a vertical code word generator 180 to produce three digital code words on its outputs on lines 181, 182 and 183. During three out of every four blanking intervals, the standard vertical code word on line 183 is coupled through a switch 184 to line 162. During the fourth vertical blanking interval when the voltage impulse shown as waveform N of FIG. 11 is present on line 112, switch 184 connects line 162 to the vertical code word present at the output of a switch 185. Switch 185 selects either one of the vertical code words present on lines 181 and 182 for presentation to the input of switch 184. If movement has not been detected by detector 120, the logical "0" present on line 121 permits switch 185 to remain in its inoperative state. This results in coupling the vertical code word from line 182 through to the digital transmitter 160. This vertical code word on line 182 will indicate to the receiver that no movement has been detected and that the transmitter and receiver will therefore operate during the next four fields in the stationary mode. If, on the other hand, movement detector 120 determines that movement has occurred, a logical "1" is established on line 121 during the voltage impulse in waveform N and this resulting logical "1" causes switch 185 to connect the vertical code word from line 181 through to the digital transmitter 160. This vertical code word on line 181 indicates to the receiver that the receiver should operate during the next four fields in the moving mode of operation. As pointed out hereinabove, alternate frames are transmitted during the stationary mode whereas alternate fields are transmitted during the moving mode.

Since the horizontal and vertical code words on lines 161 and 162 occur during the blanking intervals, no corresponding digital words representing video amplitudes are present during these intervals at the output of transmission buffer 150. Accordingly, digital transmitter 160 multiplexes the digital words on lines 161 and 162 and those present at the output of transmission buffer 150 in coupling these words through to a transmission channel 165.

Figure 2:
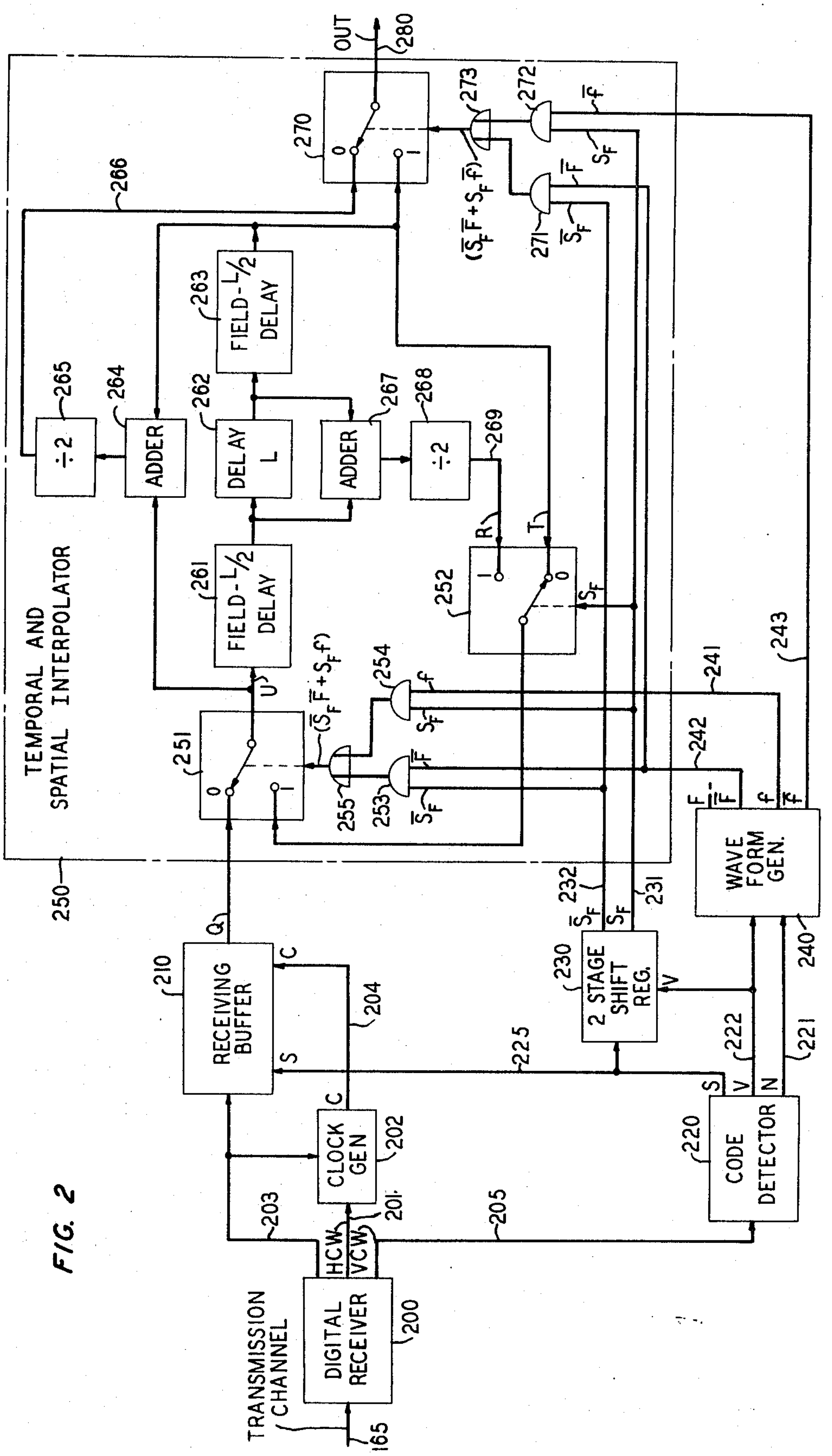
FIG. 2 is a schematic block diagram of a receiver constructed in accordance with the present invention.

The digital words present on transmission channel 165 are coupled to the input of a digital receiver 200 in FIG. 2. This receiver, in a manner well known to those skilled in the digital transmission art, separates the distinctive horizontal and vertical code words from the amplitude digital words. Each horizontal code word is coupled by way of bus 201 to the input of a clock generator 202. Generator 202 presents a stream of logical "0s" and "1s" during the active region of each horizontal video line identical to the waveform shown as waveform C in FIG. 11. The amplitude digital words are presented by digital receiver 200 by way of bus 203 to the input of a receiving buffer 210 and also to an input of clock generator 202. Each appearance of an amplitude digital word is utilized by clock generator 202 in combination with the horizontal code word to provide the synchronization which is required to produce the bit stream on line 204 at a rate which is identical to that of waveform C on line 108 in FIG. 1 at the output of clock generator 105.

Each vertical code word presented on line 205 by digital receiver 200 is coupled to the input of a code detector 220. By distinguishing between the different code words provided on lines 181, 182 and 183 in the transmitter of FIG. 1, code detector 220 provides a voltage impulse on line 221 during the blanking interval which corresponds to the presence of a voltage impulse designated as N on line 112 in the transmitter of FIG. 1. In addition, a voltage impulse is provided during each of the blanking intervals on line 222 and, finally, code detector 220 provides a logical "1" on line 225 during each of the four field intervals that have been designated by the transmitter as containing movement.

A logical "0" on line 225 indicates to the receiving buffer 210 that the amplitude digital words being received on bus 203 have been obtained from alternate frames. A logical "1" on line 225 indicates that the transmitter is operating in the moving mode and, therefore, the amplitude digital words on bus 203 have been obtained from alternate fields. Receiving buffer 210 utilizes the information provided on line 225 in combination with the bit stream provided on line 204 to redistribute the amplitude digital words provided on bus 203. As a result, the amplitude digital words are presented at the output of receiving buffer 220 at point Q in the same time sequence and with the same information gaps that existed at the output of gate 130 in the transmitter of FIG. 1. During the stationary mode, amplitude digital words are therefore present for an entire frame interval followed by an information gap equal in duration to one frame interval.

Figure 8:
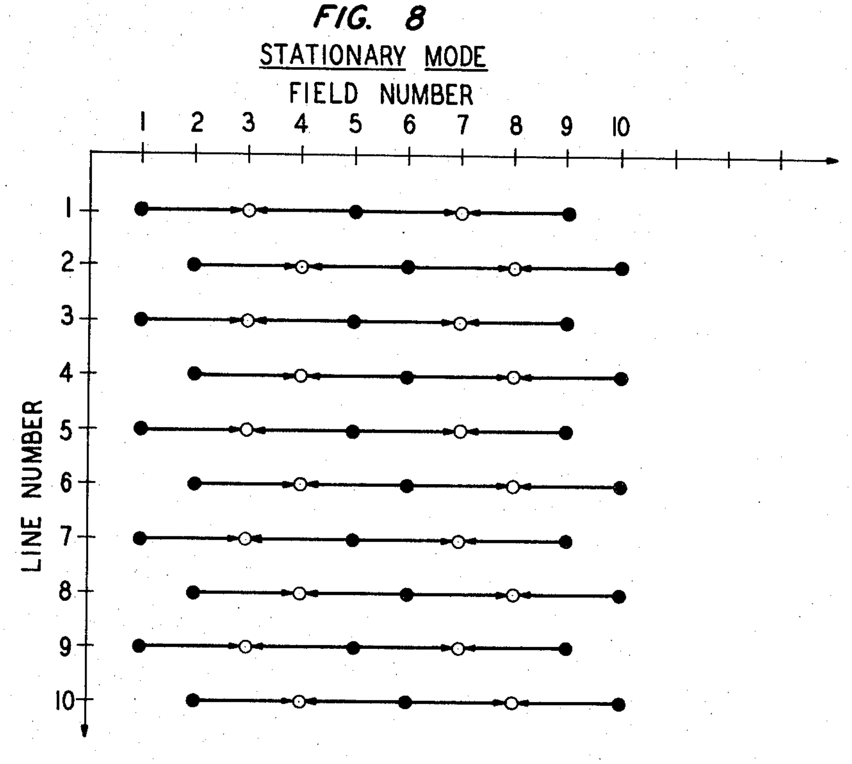
FIGS. 8, 9 and 10 are picture element diagrams which are useful in explaining the operation of the present invention during both the stationary and moving modes of operation.
Figure 9:
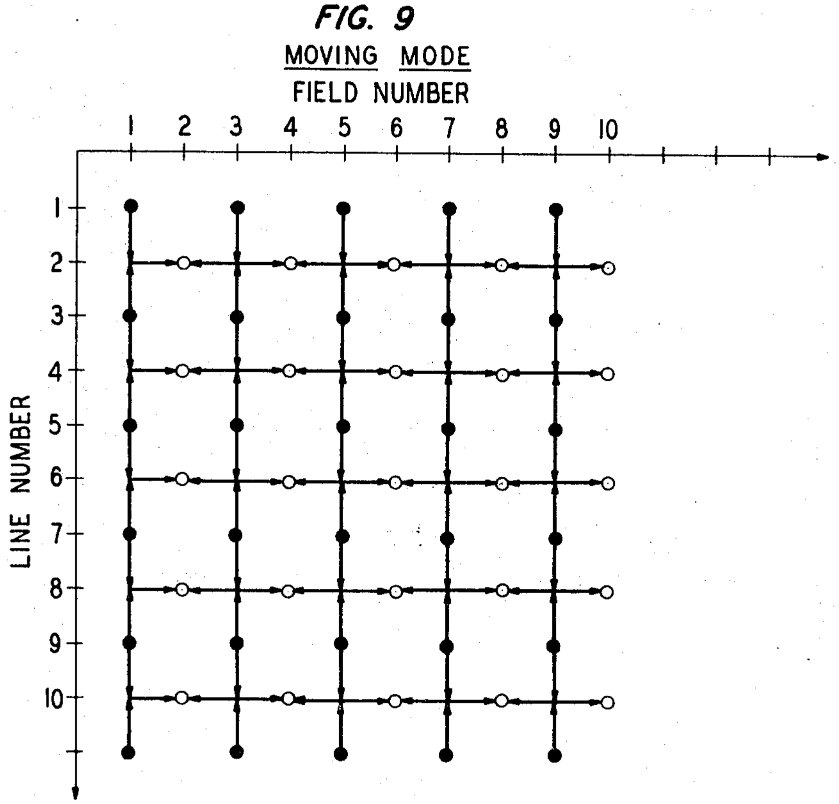

This pattern of information presentation during the stationary mode is illustrated in FIG. 8. Each darkened circle in FIG. 8 represents an entire line of video information at the output of receiving buffer 210 at point Q. Each circle that is not darkened in FIG. 8 represents a line of video information that has been blocked at the transmitting location. Similarly, the information presentation at the output of receiving buffer 220 during the moving mode is illustrated in FIG. 9 wherein the darkened circles and circles that are not darkened represent lines of video information that have and have not been transmitted.

The receiving buffer 210 in the present embodiment produces a delay equal to two field intervals between the information provided at its input and that which is provided at its output at the point Q. To compensate for this delay, a two-stage shift register 230 delays the information present on line 225 by two field intervals. Hence, the information provided on line 231 by shift register 230 is identical to that present on line 225, except that it has been delayed by two field intervals in response to the voltage impulses on line 222. The complement of the bit stream which is provided on line 231 is provided by the shift register on line 232. A waveform generator 240 responds to each of the voltage impulses provided on lines 221 and 222 and provides output waveforms which are identical to those that are designated as waveforms F and *f* in FIG. 11. The complement of F is provided on line 242 and the complement of *f* is provided on line 243.

The video information provided at the output of receiving buffer 210 is coupled to the input of a temporal and spatial interpolator 250. Interpolator 250 utilizes the information provided by receiving buffer 210, shift register 230 and waveform generator 240 to develop picture element values during those intervals when the picture element values have been blocked from being transmitted by gate 130 in the transmitter of FIG. 1. During the stationary mode, interpolator 250 establishes the amplitude value for each picture element in a line which has not been transmitted by averaging the picture element values provided for that same spatial point in the frame intervals both preceding and following the line that is to be reconstructed. This regeneration of video information during the stationary mode is indicated in FIG. 8 by the arrows, which indicate by their points of origin the picture elements that are utilized to provide the averaging within interpolator 250 and indicate by their points of termination the picture elements that are reconstructed.

The averaging process illustrated in FIG. 8 is simply a temporal interpolation, that is, an interpolation in time. Each reconstructed video frame contains the same amount of horizontal and vertical resolution that is present in each of the frames that are transmitted in their entirety.

During the moving mode, interpolator 250 reconstructs the picture elements that have not been transmitted in a fashion illustrated by the arrows in FIG. 9. Here again, each arrow terminating on a reconstructed line indicates by its points of origin those lines which are utilized by interpolator 250 in obtaining the picture element values for the reconstructed line. During the moving mode, each picture element in the reconstructed line is established by first averaging the values for the picture elements in the video lines above and below the reconstructed line in both the preceding and following video fields, and then an average is taken of two line-to-line average values. As is apparent from FIG. 9, this averaging process represents both an interpolation in time and an interpolation in space. The interpolation in time, however, occurs at a rate which is twice as fast as that which occurs during the stationary mode illustrated in FIG. 8. Accordingly, better motion rendition is provided during the moving mode illustrated in FIG. 9. The spatial interpolation, on the other hand, can introduce some amount of degradation in vertical resolution. This loss in vertical resolution is barely noticeable when processing the head-and-shoulders view of a person talking in a video-telephone system.

Temporal and spatial interpolator 250 has a switch 251 at its input which permits the interpolator to select either the digital words from point Q or the digital words provided at the output of a switch 252. Switch 251 is under the control of a logical function designated in the drawings as ($S_F F + S_F f$). This logical function is developed by AND gates 253, 254 and OR gate 255. The precise operation of switch 251 in terms of the logical "0s" and "1s" present in the $\overline{S}_F$, $\overline{F}$ and $f$ functions will be covered in connection with FIG. 12. At this point a qualitative explanation of the interpolator 250 will be given.

The digital words present at point U, the output of switch 251, are coupled through a delay 261, a line delay 262 and a delay 263. The total delay provided by all three delays 261, 262 and 263 is equal to one frame time. Each of the delays 261 and 263 are shorter than a field interval by an interval equal to one-half of a video line. Delay 262 is equal to one video line interval. The digital words present at point Q and at point T, the output of delay 263, are added in an adder circuit 264 and divided by two in divider circuit 265 to provide an average value on bus 266. In a similar fashion, the digital words present at the input and output of delay 262 are added by an adder 267 and divided by two in a divider circuit 268 to provide a line-to-line average value on bus 269 designated as point R in FIG. 2. Switch 252 selects the digital words either from point R or from point T under the control of function $S_F$ to provide these words to switch 251. The output switch 270 selects either the digital words from bus 266 or the digital words from point T under the control of a function $\overline{S}_F\overline{F} + S_F\overline{f}$.

Temporal and spatial interpolator 250 operates in a fashion which introduces a delay equal to one video frame time between point Q and output bus 280. As indicated hereinabove, receiving buffer 210 provides digital words at point Q during the stationary mode in a sequence illustrated by FIG. 8 of the drawings. During the stationary mode, switch 252 always connects point T through to switch 251 and therefore the digital words developed at point R are not utilized. During fields numbered 1 and 2 in FIG. 8, switch 251 couples the digital words present at point Q into the delay circuits 261, 262 and 263. During the intervals represented as fields 3 and 4 in FIG. 8, switch 251 couples point U through to switch 252 in order to receive the digital words from fields 1 and 2 present at the output of delay 263. This operation results in reloading fields 1 and 2 into the delay circuits 261, 262 and 263. During the interval represented by fields 3 and 4, output switch 270 is operated to its logical "1" position, and fields 1 and 2 are coupled to output bus 280 in addition to being coupled back to point U. During the intervals represented as fields 5 and 6 in FIG. 8, switch 251 couples point U through to point Q in order to receive the digital words from fields 5 and 6 into the delay circuits 261, 262 and 263. During this interval when fields 5 and 6 are being coupled into the delay circuits, output switch 270 is operated to its logical "0" position so as to provide digital words on output bus 280 that are equal to the average value of the digital words for the identical picture elements in fields 1 and 5. Hence, a third and fourth field are reconstructed at the output by adder circuit 264 and divider circuit 265 by taking the average values present in fields 1, 2, 5 and 6. During the intervals represented by fields 7 and 8 in FIG. 8, the digital words of fields 5 and 6 are reloaded into delay circuits 261, 262 and 263 by way of switch 252 and, in addition, the digital words for these fields are coupled to output bus 280 by way of switch 270. In this fashion, temporal and spatial interpolator 250 provides picture element values for the nontransmitted frames in the video signal.

The operation of interpolator 250 during the moving mode can be best described by referring to FIG. 9 and visualizing the digital words represented by the darkened circles in FIG. 9 as being present at point Q. During the moving mode, switch 252 remains operated to its logical "1" position, thereby connecting point R through to one input of switch 251. Here again, as in the stationary mode, interpolator 250 introduces a delay between point Q at its output bus 280 equal in its duration to one video frame time. During the odd-numbered fields represented in FIG. 9, switch 251 connects point U through to point Q in order to receive the digital words present at the output of receiving buffer 210. During the information gaps, that is, during the even-numbered fields represented in FIG. 9, switch 251 connects point U through to point R by way of switch 252 in order to receive the line-to-line average values established by adder circuit 267 and divider circuit 268.

Hence, during field number 2 in FIG. 9, the line-to-line average values from field 1 are coupled into delay circuit 261 while the true amplitude digital values from field 1 are being coupled into delay circuit 263. During field number 3 in FIG. 9, switch 270 connects output bus 280 through to point T so as to couple the true amplitude values from field 1 through to output bus 280. Also during field 3, the spatial point values of field 3 are loaded into delay circuit 261 by way of switch 251 and the line-to-line average values from field 1 are loaded into delay circuit 263.

During the information gap at point Q designated as field 4 in FIG. 9, the line-to-line average values for field 3 are loaded into delay circuit 261 by way of switch 252 while the true spatial point values of field 3 are being coupled into delay circuit 263. Simultaneously therewith the line-to-line averages at the output of delay circuit 263 for field 1 and the line-to-line averages for field 3 at the input of delay circuit 263 are averaged by way of adder circuit 264 and divider circuit 265, and the average of the two line-to-line averages is coupled by way of switch 270 to output bus 280. In this way, a synthetic field is produced on output bus 280 to follow field 1 with picture element values that are obtained by taking the average of four picture element amplitudes from fields 1 and 3. During the next field interval, the output switch 270 simply couples the true picture element values from field 3 through to output bus 280. During this same interval, field 5 is being loaded into delay circuit 261 and the line-to-line average values of field 3 are being loaded into delay circuit 263 in preparation for obtaining an average of two line-to-line average values in order to reconstruct a field 4.

The output digital words on output bus 280 provide a sequence of amplitudes corresponding to each and every spatial point within each succeeding video frame. As will be appreciated by those skilled in the digital art, these digital words may be transformed into analog samples and passed through a low-pass filter to produce an analog video signal.

A more detailed description of the operation of interpolator 250 can best be given in terms of a specific sequence of video fields which illustrate both the moving and stationary modes. This description will be given in conjunction with the operation illustrated in FIGS. 10 and 12 of the drawings. These figures illustrate a sequence of fields during which the operation changes from the stationary mode to the moving mode and back to the stationary mode within the shortest permissible interval in the present embodiment. To fully appreciate the operation of the entire FIGS. 1 and 2 embodiment, as illustrated in FIG. 12, it will be desirable to first discuss the detailed embodiments shown in FIGS. 5, 6 and 7.

In FIG. 12, a sequence of fields is arbitrarily designated by the numbers 1 through 14 in the left-hand column of the table. As indicated in waveforms $f$ and F of FIG. 11, these fields will each be accompanied by the sequence of logical "0s" and "1s" shown in the waveforms of FIG. 11 and designated in the columns of FIG. 12. In the particular sequence of video fields under consideration, it will be assumed that a comparison of field 1 with some previous field by movement detector 120 yielded an indication on line 121 that the picture was stationary. This results in producing a sequence of logical "0s" on line 121 during the fields numbered 2 through 5 in FIG. 12. During the field designated as number 3, the logical "1" present on line 115 from $\bar{f}$ and the logical "1" present on line 117 from F causes AND gate 501 in FIG. 5 to energize the control input of a transmission gate 502. As a result, the digital words present on bus 107 during field 3 are coupled through gate 502 to the input of a frame delay 503. One frame interval later, these digital words appear at the output of frame delay 503 and at the input designated as input A of subtractor circuit 504.

During the interval when the digital words from the field designated as number 3 are being coupled to input A of subtractor circuit 504, the digital words from field number 5 are being coupled directly by way of bus 107 to the input designated as B of subtractor circuit 504. Circuit 504 develops digital words at its output which are equal to the absolute magnitude of the difference between the two digital words presented simultaneously at its inputs A and B. If the absolute magnitude of the difference for any two digital words exceeds the threshhold level within threshhold circuit 505, an energizing pulse is coupled to one input of an AND gate 506. The other input of AND gate 506 is activated during each sampling interval by the energizing pulse on line 106 from clock generator 105. As a result, each absolute magnitude of the difference which exceeds the threshhold level of circuit 505 provides an energizing pulse to the input of a counter 507. In those circumstances where the threshhold level is exceeded, the resulting input to counter 507 represents a significant change in amplitude for the same spatial point in the picture from one video frame to the next.

Counter 507 is reset to zero by the voltage pulse on line 111 which occurs immediately prior to receiving the digital words from field 5 on bus 107, as indicated by waveform M in FIG. 11. Accordingly, at the end of field 5, counter 507 provides at its output an indication of the total number of spatial points which have encountered a significant change in amplitude during the frame interval between the fields designated as 3 and 5. If this count from counter 507 exceeds the second threshhold level provided by threshhold circuit 508, an energizing signal is provided to the input of sampling flip-flop 509. If, however, the count out of counter 507 does not exceed the threshhold level within circuit 508, a voltage level equivalent to a logical "0" is provided at the input of flip-flop 509. An energizing pulse on line 112 during the blanking interval between fields 5 and 6 causes flip-flop 509 to sample the output of threshhold circuit 508 and thereby establishes an appropriate logical voltage level at its outputs 121 and 122. As indicated hereinabove, a logical "1" is provided at line 121 if it has been determined that a significant number of changes have occurred during the frame interval between fields 3 and 5.

This logical state established by flip-flop 509 will remain on lines 121 and 122 until the next voltage pulse appears on line 112. The frequency of these pulses is illustrated in waveform N of FIG. 11. Hence, the logical "1" established on line 121 at the end of field 5 will remain for the next four fields until the end of field 9. During field 9, a similar comparison is made of the picture element amplitude values in field 9 with those in field 7. This comparison will again establish a count within counter 507 and a sampling by flip-flop 509 in the blanking interval between fields 9 and 10 determines the logical state to be provided on lines 121 and 122 during the next four fields. For purposes of the present discussion, it is assumed that the count during field 5 resulted in a logical "1" on line 121 and that the count during field 9 resulted in a logical "0". This sequence of changing logical states on line 121 is illustrated as waveform S in FIG. 11 and also by the logical "1s"and "0s" designated as column S in FIG. 12.

The logical "0" present during fields 1 through 5 on line 121 causes the control input of transmission gate 130 to be connected to the $\bar{F}$ waveform on line 118. As indicated in FIG. 12, this results in coupling all of the digital words present on bus 107 during fields 1, 2 and 5 through gate 130 to the input of transmission buffer 150. During the fields designated as 6 through 9, a logical "1" is present on line 121 and this causes the control input of transmission gate 130 to be connected to the $\bar{f}$ waveform on line 115. As indicated in FIG. 12, this results in coupling only the digital words present on bus 107 during fields 7 and 9 through gate 130 to buffer 150. A return of a logical "0" on bus 121 during field 10 causes the control input of the transmission gate to once again be connected to the $\bar{F}$ waveform and, as a result, only the digital words during fields 10, 13 and 14 are connected through to transmission buffer 150. The digital words present on bus 107 during the fields designated as 3, 4, 6, 8, 11 and 12 are blocked by transmission gate 130 from being connected through to buffer 150.

In order to provide digital transmitter 160 with a continuous stream of digital words, transmission buffer 150 couples only the amplitude digital words corresponding to the odd-numbered samples in each video line directly from gate 130 to the input of digital transmitter 160. The amplitude digital words corresponding to the even-numbered picture elements are delayed by transmission buffer 150 and coupled to transmitter 160 during the information gaps that exist when gate 130 is blocking digital words. A detailed embodiment of transmission buffer 150 is shown in FIG. 6.

Figures 6, 7:
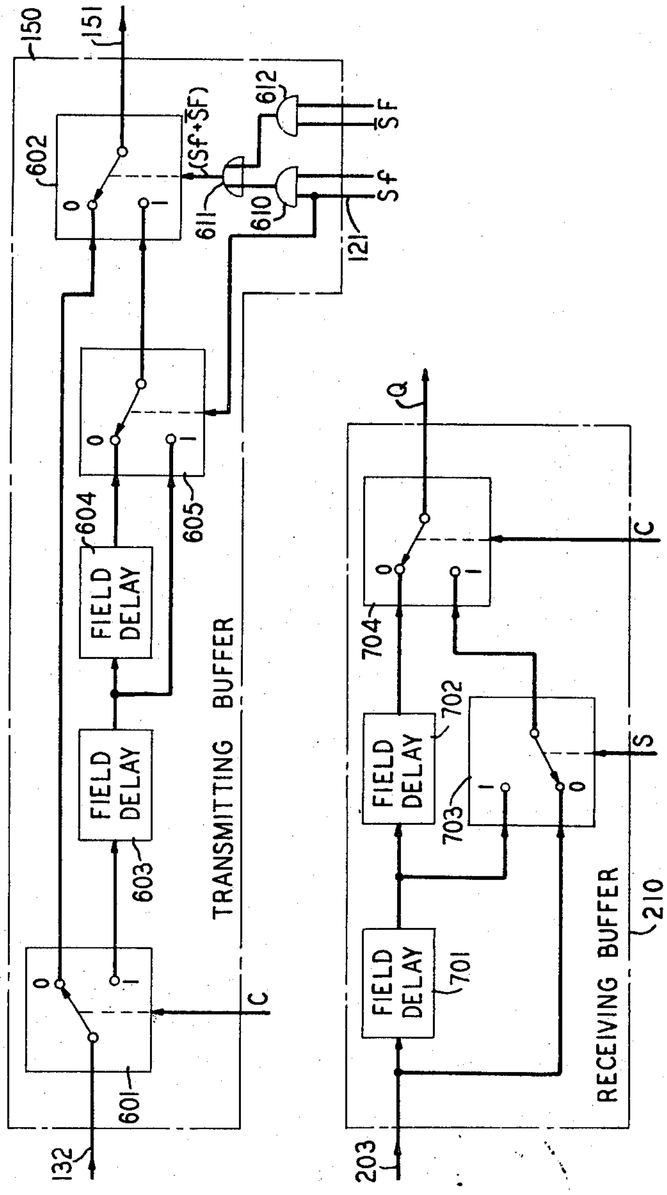

The digital words present on bus 132 at the output of gate 130 are coupled to the input of a switch 601 in FIG 6. The waveform designated as C in FIG. 11 is coupled to the control input of switch 601. During the odd-numbered samples, the logical "0" present in waveform C permits switch 601 to couple the digital words from bus 132 directly through to one input of a switch 602. As will be pointed out hereinafter, switch 602 will always couple these odd-numbered samples directly through to the output of the transmission buffer on bus 151. During the even-numbered samples, waveform C operates switch 601 so as to couple the digital word present on bus 132 through to the input of a field delay 603. One field time later, these digital words are coupled both to the input of a field delay 604 and a switch 605. The control input for switch 605 is connected directly to waveform S on line 121. If a logical "0" is present on line 121, the digital words at the output of field delay 604 are coupled to an input on switch 602. If, on the other hand, a logical "1" is present on line 121, the digital words at the output of field delay 603 are coupled to this same input of switch 602. Hence, during the field intervals when motion has not been indicated, the digital words for the even-numbered samples are presented at the logical "1" input of switch 602 one frame time after they are initially presented on bus 132. Hence, the even-numbered samples from field 1 are present at the output of switch 605 during the interval when field 3 is being blocked by transmission gate 130. Similarly, the even-numbered samples from field 2 are present at the output of switch 605 during the interval when field 4 is being blocked by gate 130.

When movement is indicated by a logical "1" on line 121, switch 605 is operated to its logical "1" position, and the digital words for the even-numbered samples are presented at the output of switch 605 one field time after their initial presentation on bus 132. Hence, the even-numbered samples from field 5 are presented at the output of switch 605 during the interval when field 6 is being blocked by transmission gate 130. Similarly, the even-numbered samples for field 7 are presented at the output of switch 605 during the interval when field 8 is being blocked by gate 130.

The control input of switch 602 is energized by a function designated in the drawings as ($Sf + \bar{S}F$). This function is developed by gates 610, 611 and 612 from the waveforms shown and designated in FIG. 11 as waveforms S, $f$ and F. As will be apparent to those skilled in the art, this function causes switch 602 to be controlled by the F waveform during intervals when there is no movement and by the $f$ waveform during intervals when there is movement. Accordingly, during fields 1 and 2, switch 602 will remain in its inoperative logical "0" state and thereby couple the odd-numbered samples through to bus 151. During fields 3 and 4, the logical "1" present in the F waveform operates switch 602 and thereby causes the even-numbered samples of fields 1 and 2 to be coupled from the output of field delay 604 through to bus 151.

During the moving mode, the logical "0" present in the $f$ waveform permits switch 602 to remain in its inoperative state during field 5. As a result, the odd-numbered samples from field 5 are coupled through switch 602 to bus 151. The logical "1" present in the $f$ waveform during field 6 causes switch 602 to operate and thereby connect the even-numbered samples from field 5 at the output of field delay 603 through to bus 151. In summary, switch 602 operates at a frame rate during the intervals when the picture is deemed to be stationary and at a field rate during the intervals when the picture is deemed to be moving. As a result, the data which is presented on bus 151 at the output transmission buffer 150 can be represented by the column of data in FIG. 12 headed by the designation "Buffered Data." In this column, each number indicates the field from which the digital words have been derived and each letter following that number indicates whether these digital words have been derived from the odd or even samples.

This buffered data out of transmitting buffer 150 is coupled to transmission channel 165 by the digital transmitter 160. In the receiver shown in FIG. 2, digital receiver 200 establishes a data sequence on bus 203 which is identical to the data sequence provided at the output of transmitting buffer 150. This data sequence, for the present example, is illustrated in the column designated as "Buffered Data" in FIG. 12. As indicated hereinabove, receiving buffer 210 redistributes the odd and even video samples so as to construct at its output, point Q, complete video fields of digital words identical to those which were allowed to pass by transmission gate 130 in FIG. 1. Receiving buffer 210 operates in a manner which introduces a delay equal to one frame time in the signals presented at its input. As a result, it will be noted from the column in FIG. 12 designated as point Q that the fields which are reconstructed at point Q are delayed in time from those which are indicated by the "Buffered Data" column as being present at the output of digital receiver 200.

A specific embodiment for the receiving buffer 210 is shown in FIG. 7. In brief, receiving buffer 210 reassembles the odd and even samples into complete video fields by delaying the odd samples until the even samples are available for interlacing. All samples coupled by way of bus 203 into the receiving buffer 210 are fed first through a field delay 701 and then through a field delay 702. In addition, all samples on bus 203 are coupled to the logical "0" input of a switch 703. The control input of switch 703 is connected to receive the S waveform on line 225. During the intervals when the S waveform indicates that the incoming data has been derived from a stationary mode of operation, the logical "0" present in the S waveform permits switch 703 to remain inoperative and thereby allows the incoming digital words on bus 203 to be coupled through switch 703 to the logical "1" input of switch 704. The logical "0" input of switch 704 is connected to receive the digital words provided at the output of field delay 702. Switch 704 has its control input connected to receive the C waveform provided on line 204 by clock generator 202.

Hence, during the interval when the even samples from fields 1 and 2 are available on bus 203, the odd samples from fields 1 and 2 after undergoing a delay of one frame interval in field delays 701 and 702 are coupled to the logical "0" input of switch 704. The C waveform operates switch 704 so as to alternately couple odd and even samples from fields 1 and 2 through to the output of receiving buffer 210.

During operation in the moving mode, the logical "1" present in the S waveform causes switch 703 to be operative and thereby connect the output of field delay 701 through to the logical "1" input of switch 704.

Hence, during the moving mode, the even samples from any one of the moving fields are available at the logical "1" input of switch 704 during the same interval when the odd samples are available at the logical "0" input of switch 704. This mode of operation is illustrated in FIG. 12 during the field interval designated as 7. At this time, the odd samples from field 7 are present at the input of receiving buffer 210. The odd samples from field 5 are available at the output of field delay 702 and the even samples from field 5 are available at the output of field delay 701. Accordingly, operation of switch 704 by the waveform C results in a reconstruction of field 5 at point Q.

Because receiving buffer 210 together with transmitting buffer 150 introduce a frame delay into the digital words that are available at point Q relative to the digital words that are available out of gate 130, it is necessary to delay the S waveform by one frame interval in order to provide the correct moving and stationary information to the temporal and spatial interpolator 250. To accomplish this result, the S waveform on line 225 is caused to operate a two-stage shift register 230 whose shifting pulse is derived by the voltage impulse on line 222 during the blanking interval. The resulting waveforms available at the output of shift register 230 are designated as $S_F$ and its complement $\overline{S}_F$. For our particular example illustrated in FIG. 5, the logical states provided at the output of shift register 230 are given in the column of FIG. 12 designated as $S_F$.

AND gates 253 and 254 and OR gate 255 operate upon the $S_F$ and $\overline{S}_F$ waveforms in combination with the $\overline{F}$ and $f$ waveforms to produce a control function for switch 251. For the particular sequence of video fields illustrated in the example of FIG. 12, the logical states provided for this control function are set forth in the column designated as $(\overline{S}_F\overline{F} + S_Ff)$. As pointed out hereinabove, this control waveform causes switch 251 to be controlled by the $\overline{F}$ function during the stationary mode and to be controlled by the $f$ function during the moving mode. As indicated by the logical "0s" and "1s" for this function in FIG. 12, switch 251 connects point U through to point Q during the intervals when data is present at point Q, and connects point U through to the output of switch 252 during those intervals when an information gap exists at point Q.

For the particular sequence of moving and stationary fields illustrated in FIG. 12, the values of the picture elements present at point U are indicated in the column designated as point U in FIG. 12. From this column of data it can be seen that fields 1 and 2 which belong to the stationary mode are present at point U not only during the interval when switch 251 is connected to point Q but also present at point U after these fields have been circulated within the delay circuits 261, 262 and 263. During the moving mode, the digital words from a field which is present at point Q, such as field 5, are followed by a line-to-line average of the picture elements. This line-to-line average is obtained from the output of switch 252 and is represented in the drawings by a bar over the number from which the initial values were obtained. For example, during the information gap at point Q between fields 5 and 7, point U is provided with the line-to-line average values from field 5 and therefore the data in the point U column during this interval is indicated as $\overline{5}$.

The line-to-line average values are obtained by adding the digital words present at the input and output of delay circuit 262 in adder circuit 267 and halving the sum in divider circuit 268. These line-to-line averages are represented in the column of FIG. 12 designated as point R. One frame time after the digital words are present at point U, they appear at the output of delay circuit 263 as indicated in the column designated as point T in FIG. 12.

Output switch 270 selects either the digital words present at point T or the digital words present at the output of divider circuit 265. As pointed out hereinabove, the output of divider circuit 265 is simply the average of the two values present at points U and T. AND gates 271 and 272, and OR gate 273 provide a control function for the operation of switch 270 which is designated in the drawing as $(\overline{S}_F\overline{F} + S_F\overline{f})$. As indicated in the column of FIG. 12 bearing an identical designation, switch 270 is switched between its two inputs during the stationary mode under the control of the $\overline{F}$ function, and is switched between its two inputs during the moving mode under the control of the $\overline{f}$ function. This results in the output values indicated by the column in FIG. 12 designated as "output."

Figure 10:
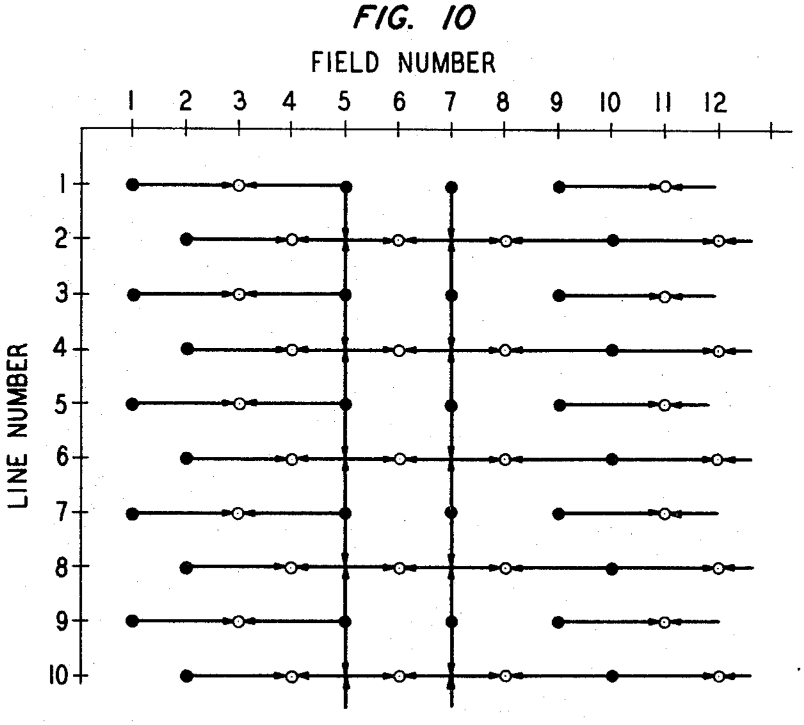

The output values that are obtained on bus 280 for the particular sequence of stationary and moving fields illustrated in FIG. 12 are also illustrated in FIG. 10. Here again, the darkened circles represent picture elements in video lines for which all element values have been transmitted whereas the undarkened circles represent picture elements in video lines for which all element values are synthetically produced within temporal and spatial interpolator 250. As indicated hereinabove, this particular sequence of fields was chosen in order to illustrate how the present embodiment operates during the change-over periods from stationary to moving modes of operation. As can be seen by FIG. 10 and as indicated in the column designated as "output" in FIG. 12, the third field at the output is reconstructed from the element values in fields 1 and 5 whereas the fourth field, although part of a stationary mode, must be constructed from picture elements in field 2 and from the line-to-line averages obtained from field 5. This is necessary during this change-over period since the element values for field 6 were not transmitted as they would have been if fields 5 and 6 had remained a part of the stationary mode. As further indicated in FIG. 10, the picture elements in field 8, although part of a moving sequence of fields, must be constructed from the line-to-line average values available in field 7 and from the element values available from field 10.

The first and last lines in each video field may contain distortions due to the actions of the averaging circuits taking averages of the last line in one field and the first line of the next field. A distortion of the last and first lines in the field is considered to be a small price to pay for a two-to-one reduction in bandwidth. By additional circuitry within interpolator 250, this distortion could be completely eliminated, but the cost of the additional circuitry is not believed to be warranted.

Figure 3:
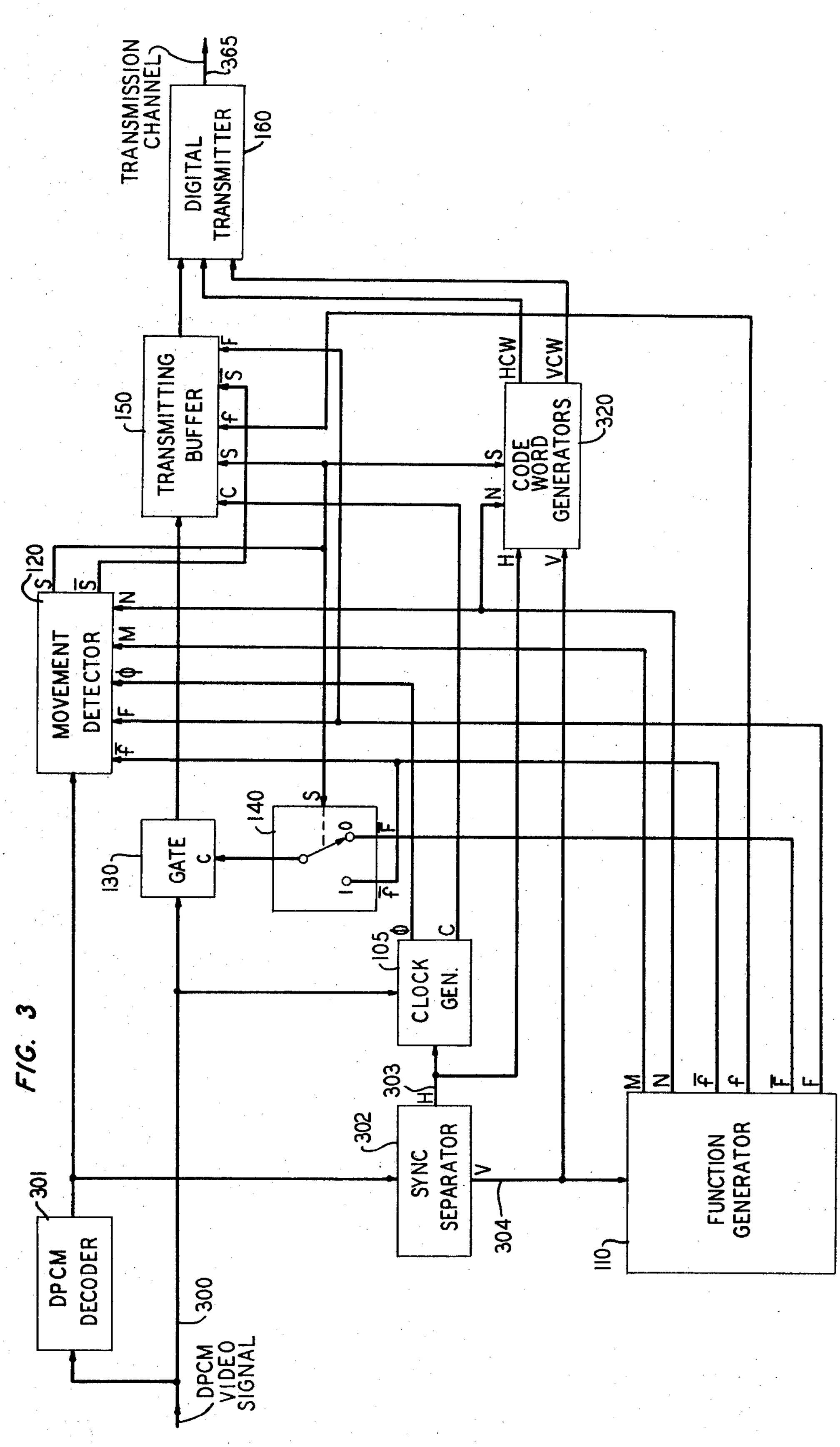
FIG. 3 is a schematic block diagram of a transmitter which may be utilized in combination with a previously encoded video signal.
Figure 4:
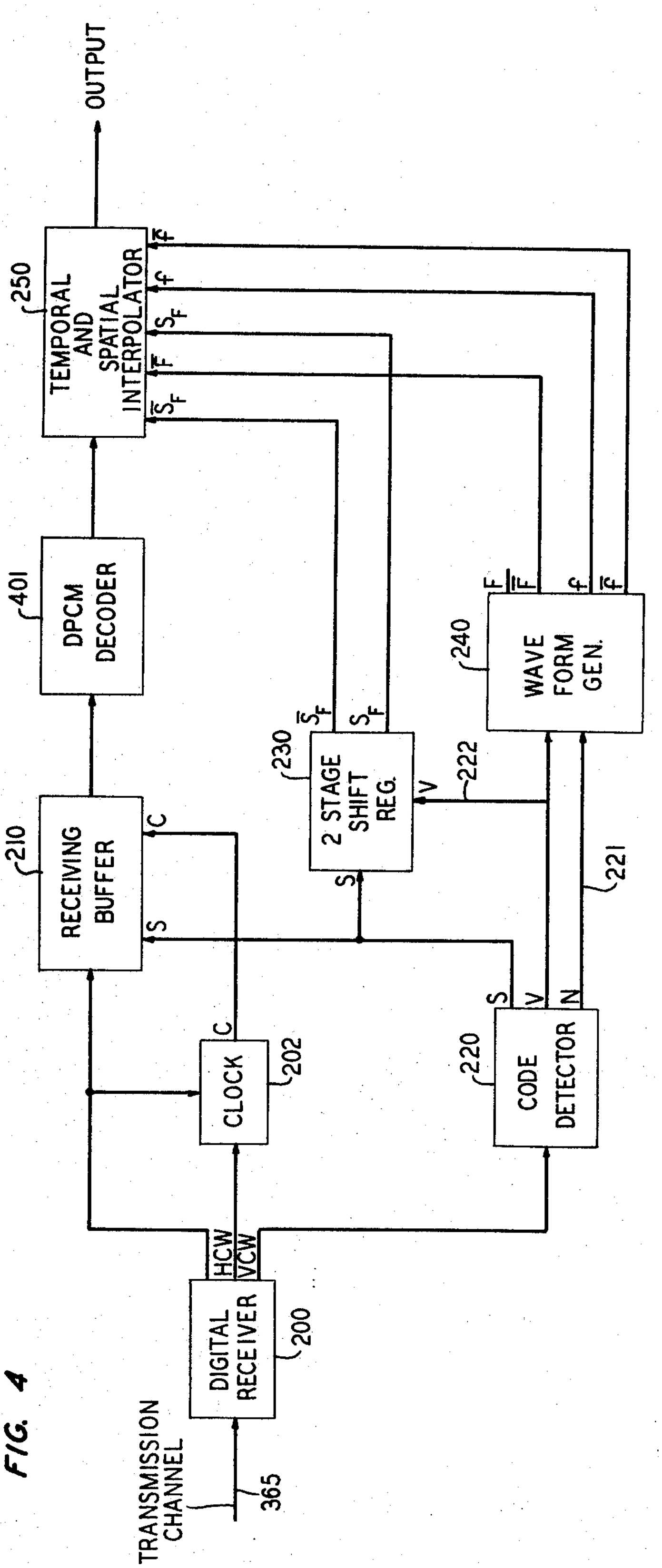
FIG. 4 is a schematic block diagram of a receiver which may be utilized in combination with the signal developed by the transmitter shown in FIG. 3.

As pointed out hereinabove, the invention is equally applicable to apparatus utilized to process video samples which have been previously encoded. One embodiment that can be utilized to process a DPCM video signal is shown in FIGS. 3 and 4 of the drawings. Apparatus that operates in an identical fashion to the apparatus which has been described hereinabove in connection with FIGS. 1 and 2 are given identical reference numeral designations in FIGS. 3 and 4.

As pointed out hereinabove, movement detector 120 compares the amplitude values of identical spatial points taken from fields that are one frame interval apart in order to determine whether or not movement has occurred in the picture. In order to provide movement detector 120 with absolute amplitude values for each spatial point, it is therefore necessary to connect a DPCM decoder between bus 300 in FIG. 3 and the input of movement detector 120. Since a complete video signal is available at the output of DPCM detector 301, sync separator 302 in FIG. 2 utilizes this signal in order to produce the horizontal and vertical voltage impulses on lines 303 and 304, respectively.

The element-to-element values present on bus 300 are coupled or blocked by gate 130 in a fashion which is identical to the one described in connection with gate 130 of FIG. 1. These element-to-element values are then buffered by transmitting buffer 150 and coupled by way of digital transmitter 160 to a transmission channel 365. Neither the gate 130, nor buffer 150, nor the transmitter 160, operates any differently due to the fact that the digital words being processed are element-to-element values rather than the absolute amplitudes of the individual picture elements. The box designated as code word generator 320 in FIG. 3 is simply a combination of the boxes designated as 170, 180, 184 and 185 in FIG. 1.

In FIG. 4, a digital receiver 200 and receiving buffer 210 operate upon the digital words transmitted over transmission channel 365 in order to provide at the output of buffer 210 a sequence of element-to-element values for entire video fields followed by information gaps during which the element-to-element values have been blocked by gate 130 in FIG. 3. A DPCM detector 401 transforms the element-to-element values available at the output of receiving buffer 210 in FIG. 4 to absolute amplitudes for each of the picture elements at the input of temporal and spatial interpolator 250. Here again, as in the case of movement detector 120, interpolator 250 is provided with the absolute amplitude values for each of the picture elements that have been transmitted in order to reconstruct by averaging the picture element values that have not been transmitted.

What has been described before is a specific embodiment of the present invention. Numerous modifications may be made by those skilled in the art without departing from the spirit and scope of the present invention. Although the embodiments described in FIGS. 3 and 4 have been illustrated in terms of a DPCM encoded video signal, it will be apparent to those skilled in the art that any other type of encoded video signal may be utilized in the present invention as long as the encoding depends only upon the element values within a single video field. For example, the video signal may be encoded in terms of line-to-line changes rather than element-to-element changes and work equally as well with the present invention. This is possible since all of the video fields which are selected for transmission in the present invention are transmitted intact.

In addition, DPCM decoder 401 need not be connected between receiving buffer 210 and interpolator 250 in FIG. 4 if the interpolator is modified by placing decoders at the input of each of the adder circuits 264 and 267. This type of embodiment would permit storage in delay lines 261, 262 and 263 to take place with fewer bits since they would be storing element-to-element values. This saving in delay line storage is of course counterbalanced by the increased cost of three more decoders. Which choice is made by the systems engineer depends on the relative cost of decoders versus delay lines.

We claim:

1. A bandwidth reduction transmitter for use with an encoded video signal having a plurality of field intervals interlaced to form a frame interval comprising a movement detector responsive to at least two fields of said video signal for indicating whether or not movement has occurred in the picture represented by said encoded video signal, means for coupling said encoded video signal to said movement detector, gating means responsive to said movement detector for blocking picture element values from alternate frames of said encoded video signal when there is no indicated movement in the picture and for blocking picture element values from alternate fields when there is indicated movement in the picture, and means for coupling the fields and frames not blocked by said gating means to a transmission channel.

2. A bandwidth reduction transmitter as defined in claim 1 wherein said means for coupling the encoded video signal to said movement detector includes a means for decoding the encoded video signal into a sample sequence wherein the amplitude value for each spatial point within the video frame is given.

3. A bandwidth reduction transmitter as defined in claim 1 wherein said means for coupling the fields and frames from said gating means to a transmission channel includes means for delaying alternate samples, and means for selectively coupling the delayed alternate samples to said transmission channel during the intervals when said gating means is blocking said encoded video signal.

4. A bandwidth reduction transmitter as defined in claim 1 wherein said movement detector includes means for delaying a video field by at least one frame interval, and means for comparing the delayed video field with a field in said encoded video signal.

5. A bandwidth reduction transmitter as defined in claim 4 wherein said means for comparing includes subtractor means for obtaining an absolute magnitude of the difference between the samples in said delayed field and the samples in said encoded video signal, and a threshold means responsive to the output of said subtractor means for producing an energizing signal only when the output of said subtractor means exceeds a threshold value during a predetermined interval.

6. A bandwidth reduction system for use with a video signal having at least two field intervals for each frame interval comprising means responsive to said video signal for detecting movement in the picture represented by said video signal, an encoding means responsive to said means for detecting movement for transmitting picture element values from alternate frames of said video signal when movement is not indicated and for transmitting picture element values from alternate fields of said video signal when movement is indicated, and receiver means for reconstituting picture element values in the nontransmitted fields and frames by averaging picture element values in two succeeding transmitted frames when there is no movement and by averaging line-to-line average values from two succeeding transmitted fields when there is movement.

7. A bandwidth reduction system as defined in claim 6 wherein the movement detector includes means for delaying the element values in a video field for at least one frame interval, and means for comparing the delayed element values with the element values in said video signal.

8. A bandwidth reduction system as defined in claim 6 wherein the encoding means for transmitting includes means for delaying alternate sample values and means for transmitting these alternate sample values during the intervals when picture element values are being blocked.

9. Apparatus for generating a picture element amplitude for a given location which is spatially adjacent to at least two picture elements the amplitude values of which are received on a periodic basis at an interval equal to one video frame interval comprising means for storing at least one amplitude value for each of said at least two picture elements for at least one frame interval, and means for averaging the amplitude values from said storage means for said at least two picture elements with newly received amplitude values for said at least two picture elements, whereby the resulting average amplitude is a spatial and temporal interpolation of the amplitude values from said at least two picture elements.

10. Apparatus as defined in claim 9 wherein said means for storing includes a delay line means whose delay is equal to at least one video frame interval, and said means for averaging includes an averaging circuit having one input connected to an input of said delay line means and another input connected to an output of said delay line means.

11. Apparatus as defined in claim 10 wherein said delay line means includes a delay line having a delay equal to the interval between receiving an amplitude value for one of said at least two picture elements and an amplitude value for a second of said at least two picture elements, and said means for averaging further includes a second averaging circuit having one input connected to an input of said delay line and another input connected to an output of said delay line.

12. Apparatus for reconstituting nontransmitted picture element values from transmitted picture element values derived from a video signal having intervals called frames and subintervals called fields comprising delay line means having an input and output for storing an entire frame of video signal samples, said delay line means including at least three delay lines connected in tandem, the center delay line of said tandem connection having a delay time equal to a fractional part of said field subinterval, a first averaging means connected to the input and output of said delay line means, a switching means for selectively coupling the output of said first averaging means or the output of said delay line means through to an output terminal, a second averaging means for averaging the values present at the input and output of said center delay line, and means for selectively coupling the input of said delay line means either to receive transmitted picture element values or to receive the output of said second averaging means or to receive the output of said delay line means.

* * * * *